(12) United States Patent
Zhu

(10) Patent No.: US 10,452,261 B2
(45) Date of Patent: Oct. 22, 2019

(54) METHODS AND APPARATUSES FOR FORM OPERATION ON A MOBILE TERMINAL

(71) Applicant: ALIBABA GROUP HOLDING LIMITED, George Town, Grand Cayman (KY)

(72) Inventor: Qin Zhu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 186 days.

(21) Appl. No.: 15/632,014

(22) Filed: Jun. 23, 2017

(65) Prior Publication Data
US 2017/0293423 A1  Oct. 12, 2017

Related U.S. Application Data

(63) Continuation of application No. PCT/CN2015/097486, filed on Dec. 15, 2015.

(30) Foreign Application Priority Data

Dec. 25, 2014  (CN) .......................... 2014 1 0844074

(51) Int. Cl.
  *G06F 3/048*  (2013.01)
  *G06F 3/041*  (2006.01)
  (Continued)

(52) U.S. Cl.
  CPC ........ *G06F 3/04883* (2013.01); *G06F 17/242* (2013.01); *G06F 17/243* (2013.01);
  (Continued)

(58) Field of Classification Search
  CPC ............. G06F 3/048; G06F 3/041; G06F 3/00
  See application file for complete search history.

(56) References Cited

U.S. PATENT DOCUMENTS 8,436,821 B1 *  5/2013  Plichta ............... G06F 3/04883
                                                  345/156
8,893,054 B2 *  11/2014  Amento ................. G06F 3/017
                                                  345/173
(Continued)

FOREIGN PATENT DOCUMENTS

CN   103065261 A   4/2013
CN   103488416 A   1/2014
(Continued)

OTHER PUBLICATIONS

European Patent Office Communication enclosing the extended European Search Report including pursuant to Rule 62 EPC, the supplementary European Search Report (Art. 153(7) EPC) and the European Search Opinion issued in European Application No. 15871885.8-1879, dated Nov. 21, 2017, 10 pages.

(Continued)

*Primary Examiner* — Hugo Molina
(74) *Attorney, Agent, or Firm* — Finnegan, Henderson, Farabow, Garrett & Dunner, LLP

(57) ABSTRACT

An exemplary method for form operation on a mobile terminal may include detecting an input hand gesture on a screen, and acquiring a trajectory of the input hand gesture. The method may also include matching the acquired trajectory of the input hand gesture with the hand gestures in correspondence in accordance with the hand-gesture comparison rules. The correspondence between hand gestures, hand-gesture comparison rules, and form operations is preset. The method may further include triggering a corresponding form operation if the matching is successful.

24 Claims, 10 Drawing Sheets

(51) Int. Cl.
*G06F 3/00* (2006.01)
*G06F 3/0488* (2013.01)
*G06F 17/24* (2006.01)
*G06F 21/32* (2013.01)
*G06K 9/00* (2006.01)

(52) U.S. Cl.
CPC ......... *G06F 21/32* (2013.01); *G06K 9/00355* (2013.01); *G06K 9/00416* (2013.01)

(56) References Cited

U.S. PATENT DOCUMENTS

| | | | |
|---|---|---|---|
| 2011/0251954 A1* | 10/2011 | Chin | G06F 3/04883 705/40 |
| 2011/0282785 A1 | 11/2011 | Chin et al. | |
| 2013/0227418 A1* | 8/2013 | Sa | G06F 3/0488 715/728 |
| 2014/0009421 A1 | 1/2014 | Lee et al. | |
| 2014/0218315 A1* | 8/2014 | Jeong | G06F 3/04883 345/173 |
| 2014/0310805 A1* | 10/2014 | Kandekar | G06F 21/36 726/19 |
| 2016/0077597 A1* | 3/2016 | Silawan | G06F 3/017 345/156 |

FOREIGN PATENT DOCUMENTS

| | | |
|---|---|---|
| CN | 103513804 A | 1/2014 |
| CN | 104123651 A | 10/2014 |
| EP | 0254561 A2 | 1/1988 |
| WO | WO 2014/008871 A1 | 1/2014 |

OTHER PUBLICATIONS

International Search Report issued in corresponding International Application No. PCT/CN2015/097486, dated Mar. 15, 2016 (6 pages).

PCT International Preliminary Report on Patentability issues in International Application No. PCT/CN2015/097486, dated Jun. 27, 2017 (10 pages).

SIPO First Office Action issued in corresponding Chinese Application No. 201410844074.3, dated May 22, 2018 (15 pages).

* cited by examiner

METHODS AND APPARATUSES FOR FORM OPERATION ON A MOBILE TERMINAL

CROSS REFERENCE TO RELATED APPLICATION

This application claims priority to International Application No. PCT/CN2015/097486, filed on Dec. 15, 2015, which claims priority to and the benefits of priority to Chinese Application No. CN 201410844074.3, filed Dec. 25, 2014, both of which are incorporated herein by reference in their entireties.

TECHNICAL FIELD

The present application relates to mobile terminals, and more particularly, to form operation methods and apparatuses on a mobile terminal.

BACKGROUND

With the rapid development of communication technologies, most mobile phones use touch screens as input devices. Currently, methods for resolving issues of form operations on a mobile terminal in the industry may focus mainly on the following two aspects:

First, a form is submitted through an OK button after the form is filled out. The OK button may be located at the very bottom of the form. A user may need to slide the screen manually to the bottom of the form.

Second, a submit button may always be hovering around the bottom of the screen. The user may submit an order by directly clicking the hovering submit button. Although the button can sometimes be convenient to find, the size of the screen of the mobile terminal can make it difficult because the submit button may block part of the content of the form. As a result, the user may still need to scroll down the form.

The existing solutions may utilize clicking a button as the only means of submitting a form. However, operations on a mobile terminal must be as simple as possible and highly fault-tolerant due to limits of the size of the screen and the size of the palm. Therefore, the existing solutions may deteriorate user experience.

SUMMARY

The present application is intended to provide a method and apparatus for form operation on a mobile terminal. When a length of a form exceeds a screen display range of the mobile terminal, a user may do a specific operation through a hand gesture at any position on the screen.

To resolve the above technical issues, in one aspect, the present disclosure is directed to a method for form operation on a mobile terminal. Correspondence between hand gestures, hand-gesture comparison rules, and form operations may be preset. The method may include detecting an input hand gesture on a screen, and acquiring a trajectory of the input hand gesture. The method may also include matching the acquired trajectory of the input hand gesture with the hand gestures in the correspondence in accordance with the hand-gesture comparison rules. The method may further include triggering a corresponding form operation if the matching is successful.

In another aspect, the present disclosure is directed to an apparatus for form operation on a mobile terminal. Correspondence between hand gestures, hand-gesture comparison rules, and form operations may be preset. The apparatus may include a detection module configured to detect an input hand gesture on a screen, and acquire a trajectory of the input hand gesture. The apparatus may also include a matching module configured to match the acquired trajectory of the input hand gesture with the hand gestures in the correspondence in accordance with the hand-gesture comparison rules. The apparatus may further include a form-operation triggering module configured to trigger a corresponding form operation if the acquired trajectory of the input hand gesture matches the hand gestures in the correspondence successfully.

In a further aspect, the present disclosure is directed to a method for submitting a form on a mobile terminal. The method may include detecting an input hand gesture on a screen, and acquiring a trajectory of the input hand gesture. The method may also include matching the acquired trajectory of the input hand gesture with a preset hand gesture. The method may further include submitting the form if the matching is successful.

In yet another aspect, the present disclosure is directed to an apparatus for submitting a form on a mobile terminal. The apparatus may include a detection module configured to detect an input hand gesture on a screen, and acquire a trajectory of the input hand gesture. The apparatus may also include a matching module configured to match the acquired trajectory of the input hand gesture with a preset hand gesture. The apparatus may further include a form submission module configured to submit the form if the matching is successful.

The embodiments of the present application may have the following results and draw the following distinctions from the existing technologies. When the length of the form may exceed a screen display range of the mobile terminal, there may be no need to scroll down to the bottom to find an operation button. Besides, there may be no need to conduct a clear operation on a hovering operational button. The user may do a specific operation through a hand gesture at any position on the screen. As a result, an individual operational button may be not required while operating the form through hand gestures. The size-limited screen may be completely used for displaying the form content.

In one aspect, if complexity of an input customized hand gesture by the user does not meet a criterion, the embodiments of the present application may include prompting the user to re-input, which may prevent an accidental operation due to an overly simple hand gesture.

In another aspect, if the form is operable after filling in a password, the embodiments of the present application may include performing a password verification by using a pre-set hand-gesture password, and operating the form accordingly. The original two-step operations may be combined into one.

In a further aspect, the embodiments of the present application may ensure that the hand gesture set by the user is reproducible to avoid a low matching rate of the set hand gesture.

In another further aspect, a hand gesture in a hand-gesture triggering template having a high priority may be firstly matched with the acquired hand gesture, thus accelerating the matching speed.

DETAILED DESCRIPTION

In the following descriptions, many technical details are provided for readers to better understand the present application. However, those of ordinary skill in the art may understand that technical solutions claimed in the claims of the present application may still be implemented even without these technical details and various changes and modifications based on the following embodiments.

The embodiments of the present invention will be described below in detail with reference to the accompanying drawings to clarify the objectives, technical solutions, and advantages of the present application.

Figure 1:
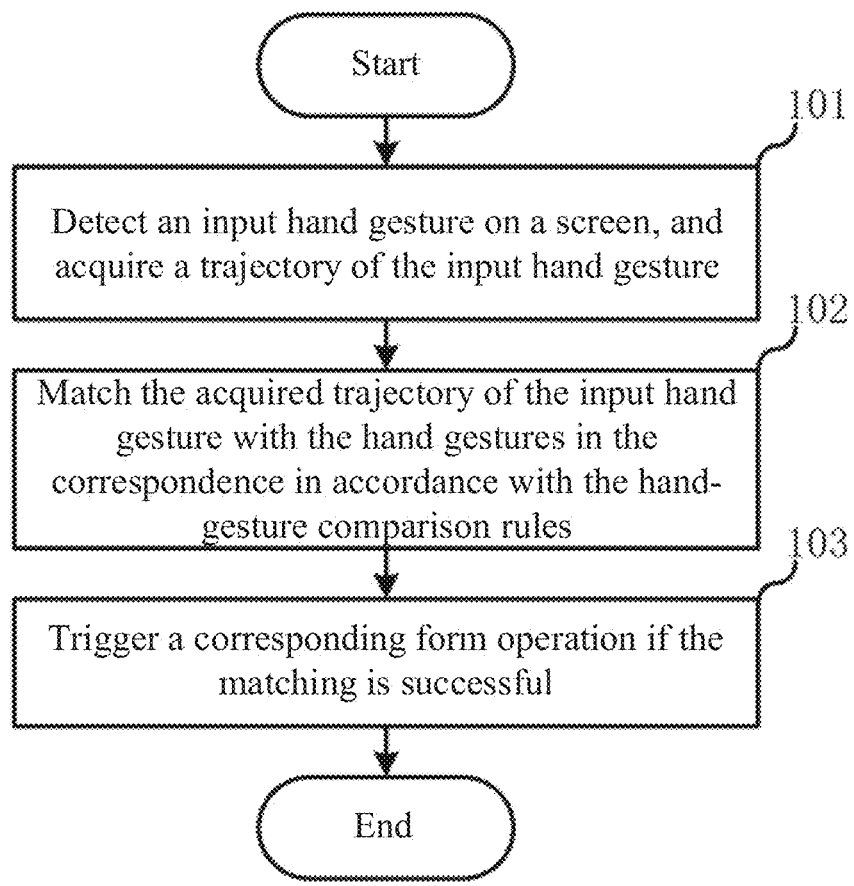
FIG. 1 is a schematic flow chart of an exemplary method for form operation on a mobile terminal, according to some embodiments of the present application.

FIG. 1 is a schematic flow chart of an exemplary method for form operation on a mobile terminal, according to some embodiments of the present application.

In some embodiments, the method for form operation on a mobile terminal may include correspondence between hand gestures, hand-gesture comparison rules, and form operations preset therein. As shown in FIG. 1, the method may include the following steps.

Step 101: Detect an input hand gesture on a screen, and acquire a trajectory of the input hand gesture.

Step 102: Match the acquired trajectory of the input hand gesture with the hand gestures in the correspondence in accordance with the hand-gesture comparison rules.

Step 103: Trigger a corresponding form operation if the matching is successful.

Figure 2:
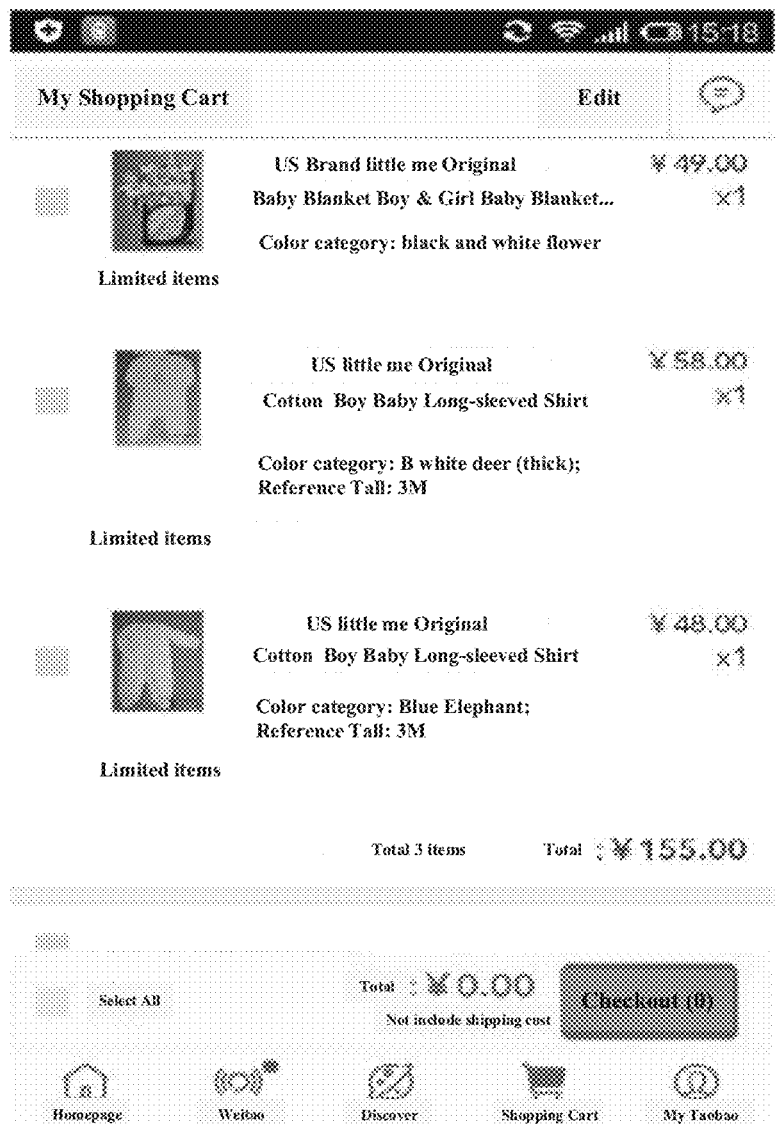
FIG. 2 is an exemplary form of an online shopping cart on a mobile terminal, according to some embodiments of the present application.
Figure 3:
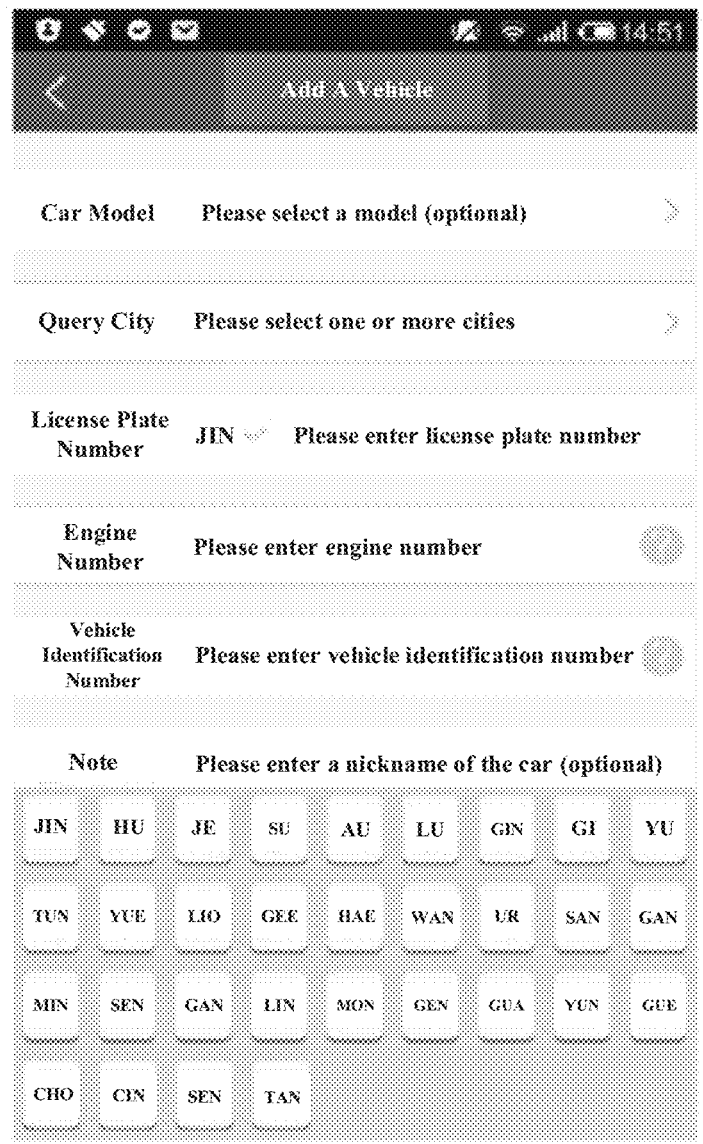
FIG. 3 is an exemplary form for adding vehicle information on an inquiry assistant application of regulation violation, according to some embodiments of the present application.

In some embodiments, the form may be a form of an online shopping cart (e.g., Taobao online shopping cart) on the mobile terminal. In some embodiments, the form may be a form for adding vehicle information on an inquiry assistant application of regulation violation. FIG. 2 is an exemplary form of an online shopping cart on a mobile terminal, according to some embodiments of the present application. FIG. 3 is an exemplary form for adding vehicle information on an inquiry assistant application of regulation violation, according to some embodiments of the present application. These forms, including car model, query city, license plate number, engine number, vehicle identification number, and note, may be so long that a submit button may be blocked by a keyboard. But when the form may be submitted by using a hand-gesture operation, there may be no need to slide to the bottom of the form to find a "Checkout" or "Submit" button.

In some embodiments, the form operation may include submitting the form, deleting an entry in the form, or another relevant operations. A process of form operation may end here.

Accordingly, when the length of the form may exceed a screen display range of the mobile terminal, there may be no need to scroll down to the bottom to find an operation button. Besides, there may be no need to conduct a clear operation on a hovering operational button. The user may do a specific operation through a hand gesture at any position on the screen. As a result, through hand gestures, an individual operational button may not be required while operating the form. The size-limited screen may be completely used for displaying the form content.

In some embodiments, the method may further include prompting to re-input the hand gesture if the complexity of a customized hand gesture input by the user does not meet a criterion. It may avoid an accidental operation due to an overly simple hand gesture. When a hand gesture is added, the method may include prompting the user to input the hand gesture multiple times. Each hand gesture of the multiple hand gestures can be stored can correspond to a hand gesture associated with the correspondence. Having multiple hand gestures can ensure that the hand gesture set by the user is reproducible, and avoid a low matching rate of the hand gesture.

In some embodiments, before step 101, the method may further include prompting the user whether there is a need to add a hand gesture to the correspondence. If the user chooses to add the hand gesture, the method may also include displaying a hand-gesture setting page, detecting an input customized hand gesture on the screen, and setting a corresponding customized hand-gesture comparison rule and a corresponding customized form operation. The method may further include storing the detected customized hand gesture, the customized hand-gesture comparison rule, and the customized form operation in the correspondence.

In some embodiments, if the user chooses not to add a hand gesture, a default hand gesture may be used.

In some embodiments, a customized hand gesture may only be stored in the mobile terminal. When the user gets another mobile terminal, the customized hand gesture can be added again. Accordingly, it may bring a high level of security.

In some embodiments, detecting the input customized hand gesture on the screen may include determining whether complexity of the detected customized hand gesture meets a criterion. If the complexity of the detected customized hand gesture does not meet the criterion, the method may include detecting another input customized hand gesture. The criterion for the complexity of the customized hand gesture may include whether a number of inflections of a hand-gesture trajectory is within a preset inflection threshold.

The method may avoid an accidental operation due to an overly simple hand gesture by determining whether the complexity of the customized hand gesture meets the criterion.

In some embodiments, the method may include determining whether the complexity meets the criterion that may be set in accordance with another feature, not limited to the number of inflections.

In some embodiments, before storing the detected customized hand gesture, the customized hand-gesture comparison rule, and the customized form operation in the correspondence, the method may further include prompting the user to input the customized hand gesture multiple times. The method may also include detecting whether the multiple customized hand gestures match with each other. If there is a match, the method may include storing the detected customized hand gesture into the correspondence.

Only when the multiple customized hand gestures match with each other, the method may include storing the customized hand gesture into the correspondence. It may ensure that the hand gesture set by the user is reproducible, and avoid a low matching rate of the hand gesture.

In some embodiments, by means of pattern recognition technologies, step 102 of the method may include comparing an irregular pattern, drawn by the user on the screen through a hand gesture, with a locally stored pattern on the mobile terminal. If the comparison is successful, it may indicate that the method includes performing the operation of submitting the current form for one time.

Figure 4:
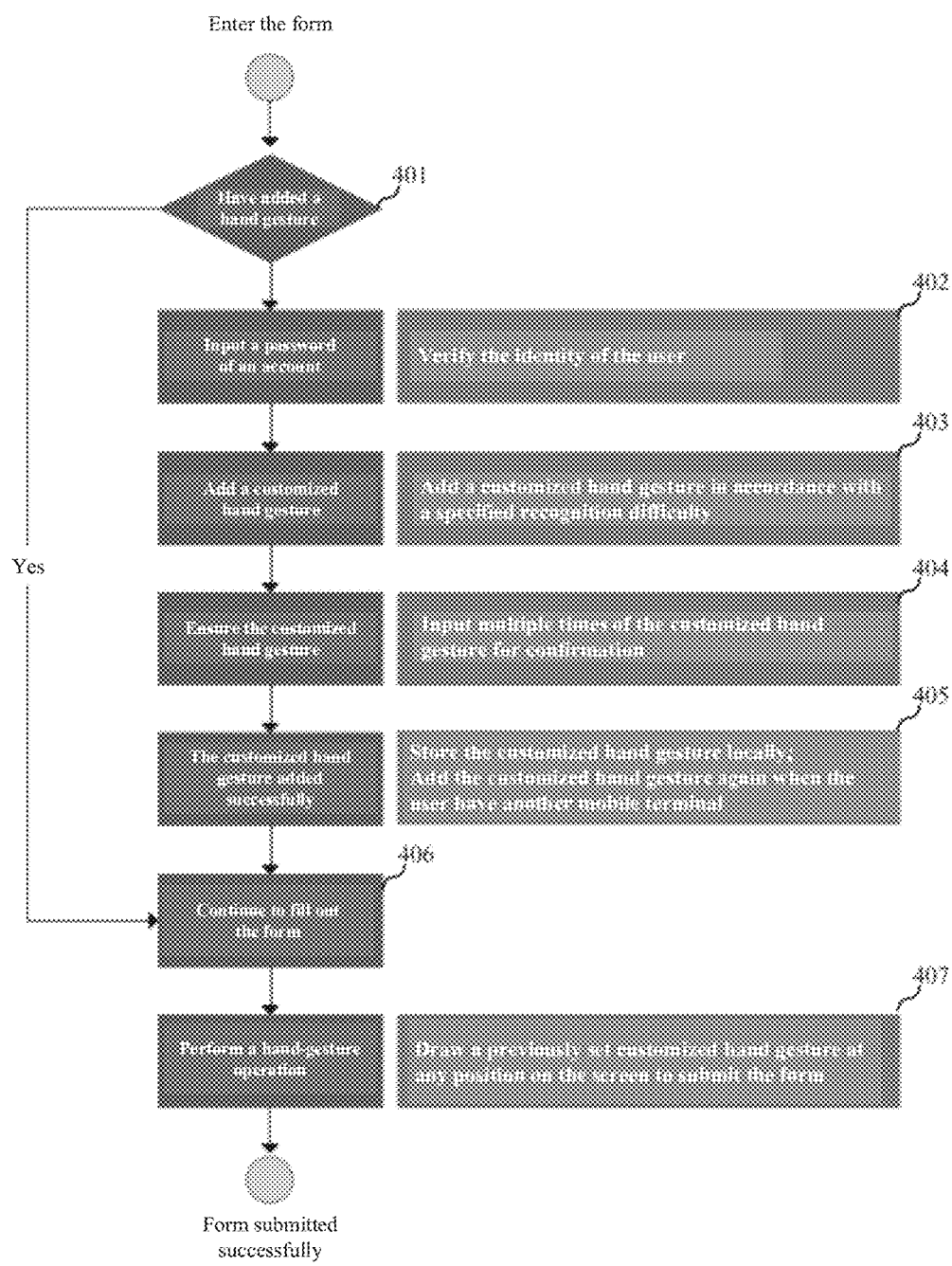
FIG. 4 is a schematic flow chart of an exemplary method for form operation on a mobile terminal, according to some embodiments of the present application.

FIG. 4 is a schematic flow chart of an exemplary method for form operation on a mobile terminal, according to some embodiments of the present application. The method may include the following steps.

In step 401, when the user may enter the form for the first time, the method may include prompting the user to add a hand gesture. If the user chooses to add, the method may also include displaying a hand-gesture setting page, and may enter step 402. If the user chooses not to set, the method may include adopting a default pattern, e.g., "√," and may enter step 406 to continue filling out the form.

In step 402, the method may include prompting the user to input an account password to verify the identity of the user.

In step 403, the method may include receiving input to add a customized hand gesture. The method may also include ensuring that an added customized hand gesture meets the required complexity of an irregular pattern in accordance with a specified recognition difficulty.

In step 404, the method may include ensuring the customized hand gesture. The method may include prompting the user to input the customized hand gesture multiple times for confirmation.

In step 405, the method may include adding the customized hand gesture. From a perspective of security, the method may include storing the customized hand gesture locally in the mobile terminal. When the user may have another mobile terminal, the user may need to add the customized hand gesture again.

In step 406, the method may include receiving information for filling out the form.

In step 407, the method may include receiving the customized hand gesture as input. When the user draws a previously set customized hand gesture at any position on the screen, the method may include submitting the form.

In some embodiments, when a customized hand gesture is added, the method may include ensuring that the added customized hand gesture meets the specified complexity to avoid a subsequent accidental operation due to an overly simple hand gesture. In some embodiments, the method may include prompting the user to input the customized hand gesture multiple times to ensure that the customized hand gesture is reproducible. In some embodiments, the method may include storing the successfully added customized hand gesture locally in the mobile terminal. It may bring a high level of security.

Some embodiments of the present application relate to a method for form operation on a mobile terminal. If the form is operable after filling in a password, the method may include performing a password verification by using a pre-set hand-gesture password, and operating the form accordingly. The original two-step operations may be combined into one. In some embodiments, a hand gesture in a hand-gesture triggering template having a high priority may be firstly matched with the acquired hand gesture, thus accelerating the matching speed.

After storing the detected customized hand gesture, the customized hand-gesture comparison rule, and the customized form operation in the correspondence, the method may further include querying the user whether there is a need to replace an input password by the stored customized hand gesture. If there is a need, the method may include displaying a password-setting page, and storing a set password in the correspondence. In the method, the step of triggering the corresponding form operation if the matching is successful may further include retrieving the stored password from the correspondence, and triggering a password verification operation.

Therefore, the method may include performing a password verification by using a pre-set hand-gesture password, and operating the form accordingly. The original two-step operations may be combined into one.

In some embodiments, the method may not include setting the password as described above.

In some embodiments, the step 102 of the method may include extracting a feature value of the input hand gesture, and comparing the feature value with a feature value of a hand-gesture comparison rule in the correspondence. The step 102 of the method may also include calculating a number of inflections of the input hand gesture, and comparing the calculated number of inflections with an inflection threshold of the hand-gesture comparison rule in the correspondence.

In some embodiments, the method may include matching sequentially in accordance with a certain manner. In some embodiments, the correspondence in the method may include at least one set of a hand gesture, a hand-gesture comparison rule, and a corresponding form operation. Each set may constitute a hand-gesture trigger template. In step 102 of the method, matching the acquired trajectory of the input hand gesture with the hand gestures in the correspondence may include matching sequentially in accordance with priorities of hand gesture trigger templates. In other words, the step 102 of the method may include matching the acquired trajectory of the input hand gesture with a hand gesture of a hand-gesture trigger template having a high priority. The priorities of hand-gesture triggering templates may be sorted in accordance with historically cumulative operational numbers of hand gestures in the templates.

In some embodiments, the method may include sorting the matching sequence of the hand-gesture triggering templates in accordance with other manners.

Figure 5:
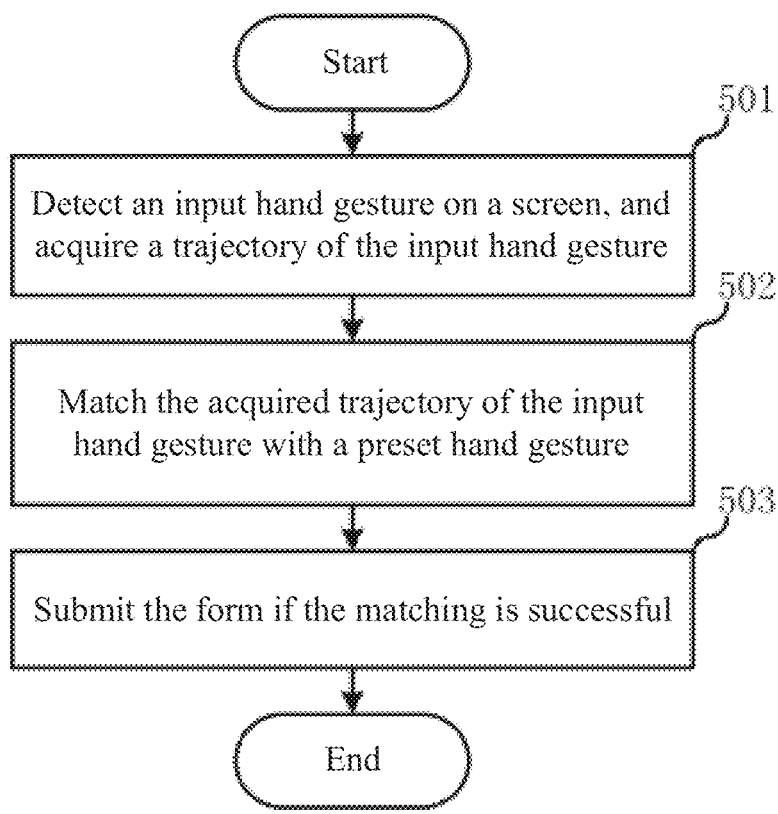
FIG. 5 is a schematic flow chart of an exemplary method for submitting a form on a mobile terminal, according to some embodiments of the present application.

Some embodiments of the present application relate to a method for submitting a form on a mobile terminal. FIG. 5 is a schematic flow chart of an exemplary method for submitting a form on a mobile terminal, according to some embodiments of the present application.

As shown in FIG. 5, the method may include the following steps.

Step 501: Detect an input hand gesture on a screen, and acquire a trajectory of the input hand gesture.

Step 502: Match the acquired trajectory of the input hand gesture with a preset hand gesture.

Step 503: Submit the form if the matching is successful.

In some embodiments, before step 501, the method may further include prompting a user whether there is a need to add a preset hand gesture. If the user chooses to add a present hand gesture, the method may include displaying a hand-gesture setting page, and detecting an input customized hand gesture on the screen. The method may also include storing the detected customized hand gesture to be the preset hand gesture.

In some embodiments, after storing the detected customized hand gesture to be the preset hand gesture, the method may further include querying the user whether there is a need to replace an input password by the stored customized hand gesture. If there is a need, the method may also include displaying a password-setting page, and storing a set password. In the method, the step of submitting the form if the matching is successful may further include retrieving the stored password, and triggering a password verification operation.

Figure 6:
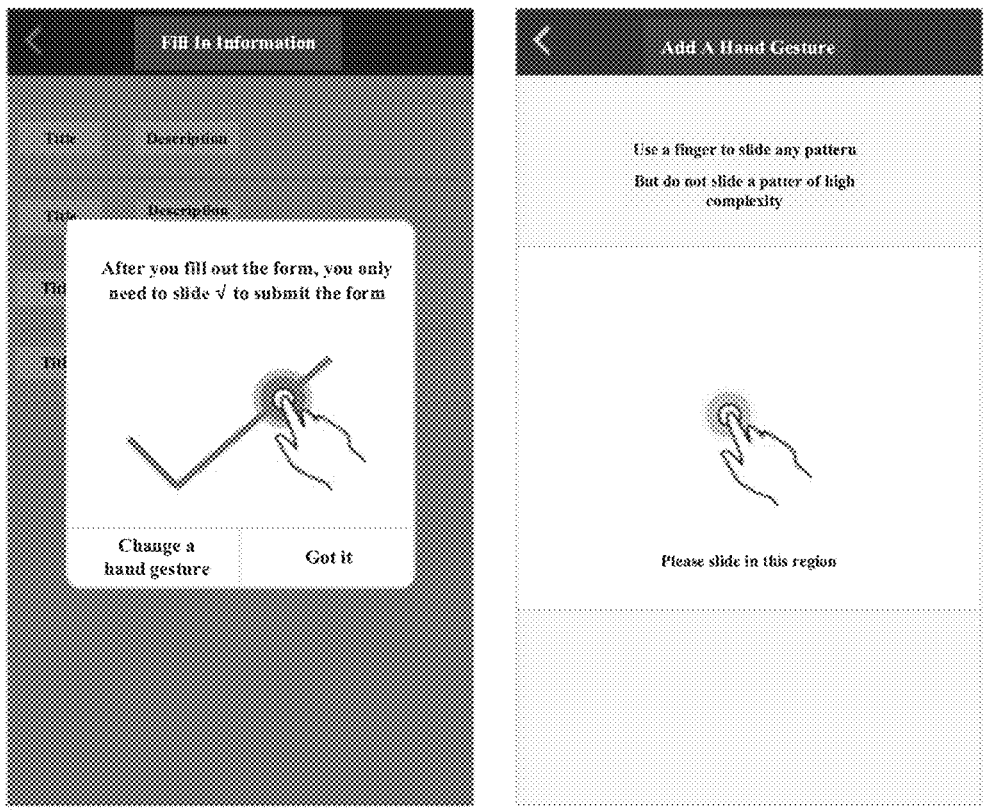
FIGS. 6-8 are exemplary screenshots provided on a mobile terminal, according to some embodiments of the present application.
Figure 7:
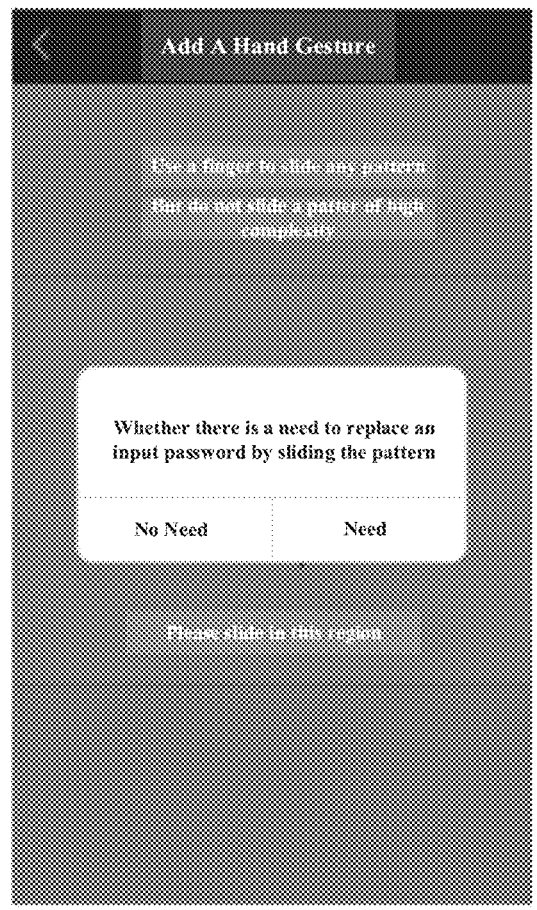
Figure 8:
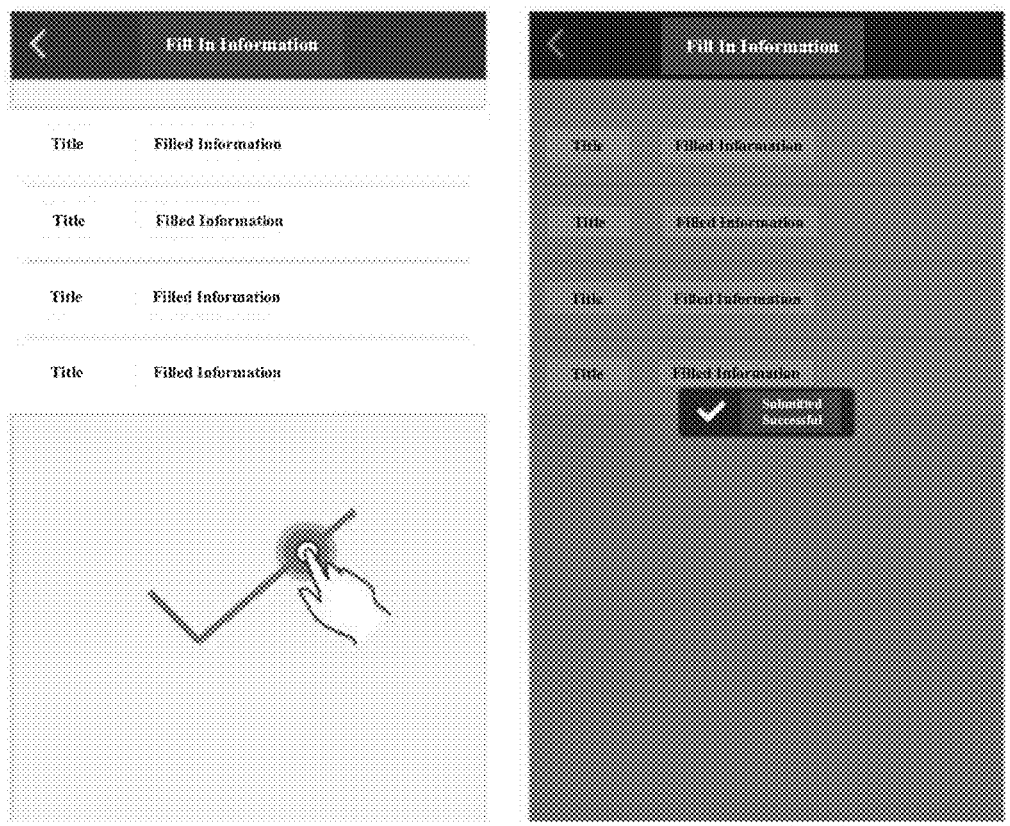

FIGS. 6-8 are snapshots of major pages in an exemplary method for form operation on a mobile terminal, according to some embodiments of the present application. As shown in FIG. 6, when the user enters the form for the first time, the method may include prompting the user that the form may be submitted through a hand gesture. The method may also include prompting the user that a customized hand gesture may be used to submit the form. As shown in FIG. 7, after the customized hand gesture is set successfully, the method may include querying the user whether there is a need to replace an input password at this moment. As shown in FIG. 8, the user may submit the form by operating the previously set hand gesture at any position on the screen.

The embodiments of the present application may provide the following technical results:

1. It may only be necessary to add a hand gesture for the first time or event. In some embodiments where a default hand gesture is used, it may be unnecessary to add any hand gesture. For subsequent form submissions, the user may only need to operate the added hand gesture or the default one at any position on the screen to submit the form.

2. When the length of the form may exceed the screen display range, there may not be a need to scroll down to the bottom to find a submit button. The user may submit the form through a specific hand gesture at any position on the screen.

3. If a form may be submitted only after filling in a password, the user may pass the password verification process through a previously set hand gesture password and submit the form at the same time. The original two-step operations are combined into one.

All method embodiments of the present application may be implemented by means of software, hardware, firmware, or the like. No matter these method embodiments are implemented by means of software, hardware, or firmware, their instruction codes may be stored in any type of computer accessible memory, such as permanent or modifiable, volatile or non-volatile, solid-state or non-solid-state, and fixed or replaceable medium. In some embodiments, their instruction codes may achieve the best results by using Objective C for iOS and Java for Andriod.

The memory may be include, for example, a Programmable Array Logic (PAL), a Random Access Memory (RAM), a Programmable Read Only Memory (PROM), a Read-Only Memory (ROM), an Electrically Erasable Programmable ROM (EEPROM), a magnetic disk, an optical disc, a Digital Versatile Disc (DVD), and so on.

Figure 9:
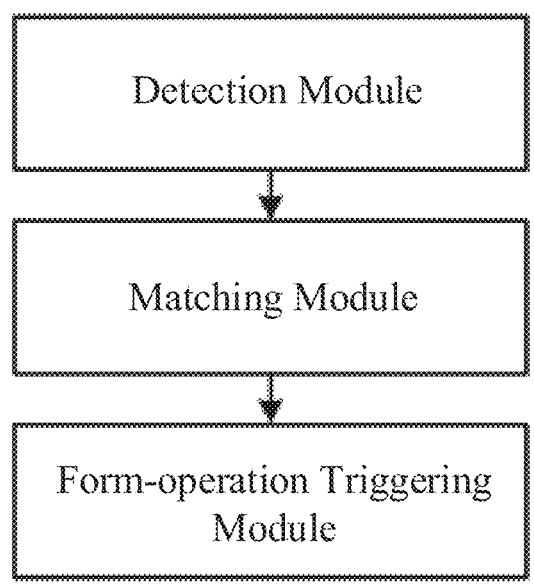
FIG. 9 is a schematic structural diagram of an exemplary apparatus for form operation on a mobile terminal, according to some embodiments of the present application.

Some embodiments of the present application relate to an apparatus for form operation on a mobile terminal. FIG. 9 is a schematic structural diagram of an exemplary apparatus 900 for form operation on a mobile terminal, according to some embodiments of the present application.

The apparatus for form operation on the mobile terminal may include preset correspondence between hand gestures, hand-gesture comparison rules, and form operations. As shown in FIG. 9, the apparatus may include the following modules:

A detection module 901 configured to detect an input hand gesture on a screen, and acquire a trajectory of the input hand gesture.

A matching module 902 configured to match the acquired trajectory of the input hand gesture with the hand gestures in the correspondence in accordance with the hand-gesture comparison rules.

A form-operation triggering module 903 configured to trigger a corresponding form operation if the acquired trajectory of the input hand gesture matches the hand gestures in the correspondence successfully.

In general, the word "module," as used herein, can be a packaged functional hardware unit designed for use with other components (e.g., portions of an integrated circuit) or a part of a program (stored on a computer readable medium) that performs a particular function of related functions. The module can have entry and exit points and can be written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

The embodiments associated with FIG. 1 may correspond to and be implemented in accordance with these embodiments in FIG. 9. Related technical details disclosed in the embodiments associated with FIG. 1 may be applicable to these embodiments with FIG. 9. Therefore, those technical details may be skipped here to avoid repetition. Similarly, related technical details disclosed in these embodiments with FIG. 9 may be applicable to the embodiments associated with FIG. 1.

Some embodiments of the present application relate to an apparatus for form operation on a mobile terminal. The apparatus may be configured to prompt the user to re-input if complexity of a customized hand gesture input by the user does not meet a criterion. The criterion may help avoid an accidental operation due to an overly simple hand gesture.

When a customized hand gesture is added, the apparatus may be configured to prompt the user to input the customized hand gesture for multiple times. When the multiple input customized hand gestures sufficiently match with each other, the apparatus may be configured to store the customized hand gesture (and corresponding multiple hand gestures) to the correspondence. The multiple hand gestures may ensure that the customized hand gesture set by the user is reproducible, and avoid a low matching rate of the hand gesture.

In some embodiments, the apparatus for form operation on the mobile terminal may further include a hand-gesture adding module configured to prompt a user whether there is a need to add a hand gesture to the correspondence.

If the user chooses to add, the hand-gesture adding module may be configured to display a hand-gesture setting page. The detection module may be configured to detect an input customized hand gesture on the screen. The hand-gesture adding module may be further configured to set a corresponding customized hand-gesture comparison rule and a corresponding customized form operation. The hand-gesture adding module may also be configured to store the detected customized hand gesture, the customized hand-gesture comparison rule, and the customized form operation in the correspondence. If the user chooses not to add a customized hand gesture, the apparatus may be configured to use a default hand gesture.

In some embodiments, the apparatus may store the preset hand gesture locally on the mobile terminal. The user may need to add the hand gesture again when the user may get another mobile terminal. It may bring a high level of security.

In some embodiments, the hand-gesture adding module may further include a complexity determining sub-module configured to determine whether complexity of the detected customized hand gesture meets a criterion. If the complexity of the detected customized hand gesture does not meet the criterion, the detection module may be further configured to detect another input customized hand gesture. The criterion for the complexity of the customized hand gesture may include whether a number of inflections of a hand-gesture trajectory is within a preset inflection threshold.

In some embodiments, the complexity determining sub-module may be configured to determine whether the complexity meets the criterion that may be set in accordance with another feature, not limited to the number of inflections.

In some embodiments, the hand-gesture adding module may be configured to prompt the user to input the customized hand gesture multiple times. The matching module may be configured to detect whether the multiple times of the input customized hand gesture match with each other. If there is a match, the hand-gesture adding module may be configured to store the detected custom gesture in the correspondence.

These embodiments may correspond with and be implemented in accordance with the embodiments described above regarding the prompting to re-input the hand gesture. Related technical details disclosed above may be applicable to these embodiments. Therefore, those technical details may be skipped here to avoid repetition. Similarly, related technical details disclosed in these embodiments may be applicable to the embodiments described above regarding the prompting to re-input the hand gesture.

Some embodiments may include the following features. If the form is operable after filling in a password, the method may include performing a password verification by using a pre-set hand-gesture password, and operating the form accordingly. The original two-step operations may be combined into one. In some embodiments, a hand gesture in a hand-gesture triggering template having a high priority may be first matched with the acquired hand gesture, thus accelerating the matching speed.

In some embodiments, the apparatus for form operation on the mobile terminal may further include a password adding module configured to query the user whether there is a need to replace an input password by the stored customized hand gesture. If there is a need, the password adding module may be configured to display a password-setting page, and storing a set password in the correspondence. The form-operation triggering module may further include a password verification sub-module configured to retrieve the stored password from the correspondence, and trigger a password verification operation.

In some embodiments, the apparatus of the present application may not be configured to set the password.

In some embodiments, the matching module may include:

A feature matching sub-module configured to extract a feature value of the input hand gesture, and compare the feature value with a feature value of a hand-gesture comparison rule in the correspondence.

An inflection matching sub-module configured to calculate a number of inflections of the input hand gesture, and compare the calculated number of inflections with an inflection threshold of the hand-gesture comparison rule in the correspondence.

In some embodiments, the correspondence may include at least one set of hand gesture, a hand-gesture comparison rule, and a corresponding form operation. Each set may constitute a hand-gesture trigger template. The matching module may be configured to match the acquired trajectory of the input hand gesture with a hand gesture of a hand-gesture trigger template having a high priority in accordance with priorities of hand gesture trigger templates for matching. The priorities of hand-gesture triggering templates may be sorted in accordance with historically cumulative operational numbers of hand gestures in the templates.

In some embodiments, the apparatus may be configured to sort the matching sequence of the hand-gesture triggering templates in accordance with other manners.

These embodiments may correspond to and be implemented with the embodiments described above regarding performing a password verification by using a pre-set hand-gesture password. Related technical details disclosed in the these embodiments have been further described above. Therefore, those technical details may be skipped here to avoid repetition. Similarly, related technical details disclosed in these embodiments may be applicable to those embodiments described above.

Figure 10:
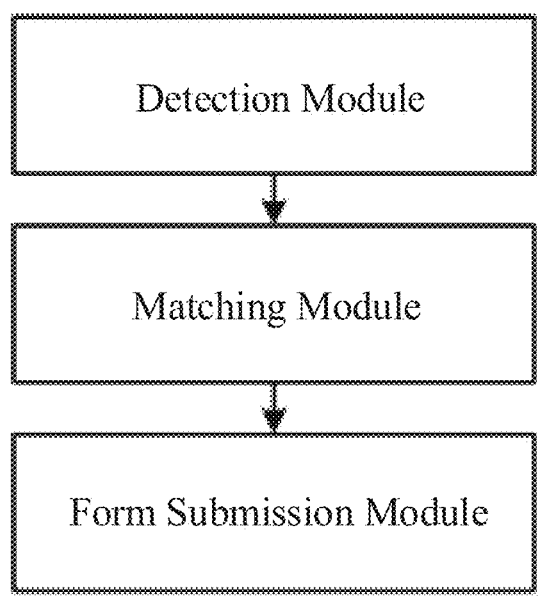
FIG. 10 is a schematic structural diagram of an exemplary apparatus for submitting a form on a mobile terminal, according to some embodiments of the present application.

Some embodiments of the present invention relate to an apparatus for submitting a form on a mobile terminal. FIG. 10 is a schematic structural diagram of an exemplary apparatus 1000 for submitting a form on a mobile terminal, according to some embodiments of the present application.

As shown in FIG. 10, the apparatus may include:

A detection module 1001 configured to detect an input hand gesture on a screen, and acquire a trajectory of the input hand gesture.

A matching module 1002 configured to match the acquired trajectory of the input hand gesture with a preset hand gesture.

A form submission module 1003 configured to submit the form if the matching is successful.

In some embodiments, the apparatus for submitting the form on the mobile terminal may further include a hand-gesture adding module configured to prompt a user whether there is a need to add a preset hand gesture. If the user chooses to add the hand gesture, the hand-gesture adding module may be configured to display a hand-gesture setting page. The detection module may be configured to detect an input customized hand gesture on the screen. The hand-gesture adding module may also be configured to store the detected customized hand gesture to be the preset hand gesture.

In some embodiments, the apparatus for submitting the form on the mobile terminal may further include a password setting module configured to query the user whether there is a need to replace an input password by the stored customized hand gesture. If there is a need, the password setting module may also be configured to display a password-setting page, and store a set password. Form submission module 1003 may further include a password calling sub-module configured to retrieve the stored password, and trigger a password verification operation.

These embodiments may correspond to and be implemented in accordance with the steps of the embodiments described above with FIG. 5, and vice versa. Related technical details disclosed in the embodiments of FIG. 5 may be applicable to these embodiments. Therefore, those technical details may be skipped here to avoid repetition.

It should be noted that various modules mentioned in the apparatus embodiments of the present application may be all logic modules. Physically, a logic module may be a physical module, or a part of the physical module. A logic module may be implemented with a combination of a plurality of physical modules. Physical embodiments of these logic modules may not be the most important, but a combination of functions implemented by these logic modules may be the key to solve the technical issues in the present application. In addition, in order to highlight innovative parts of the present application, the apparatus embodiments of the present application may not include those modules that are not related to the technical issues in the present application. It may not indicate that the apparatus embodiments do not include other modules.

It should be noted that in the claims and the specification of this application, relational terms herein, such as first and second, may be used merely to distinguish one entity or operation from another entity or operation without requiring or implying any actual such relationship or sequence between these entities or operations. Furthermore, the term "include," "comprise," and any other variants thereof are intended to cover non-exclusive inclusion. A process, a method, an article or a device including a series of elements may not only include those elements, but also include other elements not explicitly listed, or may further include inherent elements of the process, the method, the article or the device. In the absence of more limitations, an element as defined by a statement "including a/an . . . " may be not exclusive of additional identical elements in the process, the method, the article or the device including the element.

Although the present application has been illustrated and described with reference to some preferred embodiments of the present application, those of ordinary skill in the art should understand that different variations may be made thereto in form and details without departing from the spirit and scope of the present application.

What is claimed is:

1. A method for form operation on a mobile terminal, the method comprising:
 adding a hand gesture to a correspondence by detecting an input customized hand gesture on a screen and storing the detected customized hand gesture in the correspondence;
 detecting an input hand gesture on a screen, and acquiring a trajectory of the input hand gesture;
 matching, in accordance with hand-gesture comparison rules, the acquired trajectory of the input hand gesture with one or more hand gestures of a hand-gesture trigger template included in the correspondence and having a higher priority in accordance with priorities of hand-gesture trigger templates, wherein the priorities of hand-gesture trigger templates are sorted in accordance with historically cumulative operational numbers of hand gestures in the templates;
 triggering a corresponding form operation in response to a match,
 wherein detecting the input customized hand gesture on the screen includes:
 determining whether complexity of the detected customized hand gesture meets a criterion; and
 in response to the complexity of the detected customized hand gesture not meeting the criterion, detecting another input customized hand gesture.

2. The method for form operation on the mobile terminal according to claim 1, wherein adding the hand gesture to the correspondence is further performed by:
 prompting whether to add the hand gesture to the correspondence;
 in response to receiving the input to add the hand gesture:
 displaying a hand-gesture setting page,
 detecting the input customized hand gesture on the screen, and
 setting a corresponding hand-gesture comparison rule and a corresponding form operation; and
 storing the detected customized hand gesture, the corresponding hand-gesture comparison rule, and the corresponding form operation in the correspondence.

3. The method for form operation on the mobile terminal according to claim 2, wherein the criterion for the complexity of the customized hand gesture includes: whether a number of inflections of a hand-gesture trajectory is within a preset inflection threshold.

4. The method for form operation on the mobile terminal according to claim 2, wherein after storing the detected customized hand gesture, the corresponding hand-gesture comparison rule, and the corresponding form operation in the correspondence, the method further comprises:
 querying whether to replace an input password by the stored customized hand gesture; and
 in response to receiving an input to replace the input password:
 displaying a password-setting page, and
 storing a set password in the correspondence,
 wherein triggering the corresponding form operation if the matching is successful includes retrieving the stored password from the correspondence, and triggering a password verification operation.

5. The method for form operation on the mobile terminal according to claim 2, wherein before storing the detected customized hand gesture, the corresponding hand-gesture comparison rule, and the corresponding form operation in the correspondence, the method further comprises:
 prompting the user to input one or more other customized hand gestures;

detecting whether the input customized hand gesture corresponds with at least some of the one or more other input customized hand gestures; and in response to one or more correspondences, storing the input customized hand gesture and the corresponding input customized hand gestures into the correspondence.

6. The method for form operation on the mobile terminal according to claim 1, wherein matching the acquired trajectory of the input hand gesture with the hand gestures in the correspondence in accordance with the hand-gesture comparison rules includes:

extracting a feature value of the input hand gesture, comparing the feature value with a feature value of a first hand-gesture comparison rule in the correspondence; and calculating a number of inflections of the input hand gesture, and comparing the calculated number of inflections with an inflection threshold of the first hand-gesture comparison rule in the correspondence.

7. The method for form operation on the mobile terminal according to claim 1, wherein the correspondence includes at least one set of a hand gesture, a hand-gesture comparison rule, and a corresponding form operation, each set constituting a hand-gesture trigger template.

8. A method for submitting a form on a mobile terminal, the method comprising:

adding a preset hand gesture to a correspondence by detecting an input customized hand gesture on a screen and storing the detected customized hand gesture in the correspondence;

detecting an input hand gesture on a screen, and acquiring a trajectory of the input hand gesture;

determining, in accordance with hand-gesture comparison rules, whether the acquired trajectory of the input hand gesture matches a preset hand gesture of a hand-gesture trigger template included in the correspondence and having a higher priority in accordance with priorities of hand-gesture trigger templates, wherein the priorities of hand-gesture trigger templates are sorted in accordance with historically cumulative operational numbers of hand gestures in the templates;

in response to a match, submitting the form, wherein detecting the input customized hand gesture on the screen further includes:

determining whether complexity of the detected customized hand gesture meets a criterion; and in response to the complexity of the detected customized hand gesture not meeting the criterion, detecting another input customized hand gesture.

9. The method for submitting the form on the mobile terminal according to claim 8, wherein adding the preset hand gesture to the correspondence is further performed by:

prompting a user whether to add the preset hand gesture;

in response to an indication that the preset hand gesture is to be added:

displaying a hand-gesture setting page, and detecting the input customized hand gesture on the screen; and storing the detected customized hand gesture to be the preset hand gesture.

10. The method for submitting the form on the mobile terminal according to claim 9, wherein after storing the detected customized hand gesture to be the preset hand gesture, the method further comprises:

querying whether to replace an input password by the stored customized hand gesture; and in response to the query to replace the input password: displaying a password-setting page, and storing a set password, wherein submitting the form if the matching is successful further includes retrieving the stored password, and triggering a password verification operation.

11. A mobile terminal apparatus for form operation, the apparatus comprising:

a memory storing a set of instructions; and one or more processors configured to execute the set of instructions to cause the mobile terminal apparatus to perform:

adding a hand gesture to a correspondence by detecting an input customized hand gesture on a screen and storing the detected customized hand gesture in the correspondence;

detecting an input hand gesture on a screen, and acquiring a trajectory of the input hand gesture;

matching, in accordance with hand-gesture comparison rules, the acquired trajectory of the input hand gesture with one or more hand gestures of a hand-gesture trigger template included in the correspondence and having a higher priority in accordance with priorities of hand-gesture trigger templates, wherein the priorities of hand-gesture trigger templates are sorted in accordance with historically cumulative operational numbers of hand gestures in the templates;

triggering a corresponding form operation in response to the acquired trajectory of the input hand gesture matching the one or more hand gestures, wherein detecting the input customized hand gesture on the screen further includes:

determining whether complexity of the detected customized hand gesture meets a criterion; and in response to the complexity of the detected customized hand gesture not meeting the criterion, detecting another input customized hand gesture.

12. The mobile terminal apparatus for form operation according to claim 11, wherein adding the hand gesture to the correspondence is further performed by:

prompting whether to add the hand gesture to the correspondence;

in response to receiving the input to add the hand gesture:

displaying a hand-gesture setting page, detecting the input customized hand gesture on the screen, and setting a corresponding customized hand-gesture comparison rule and a corresponding customized form operation; and storing the detected customized hand gesture, the corresponding hand-gesture comparison rule, and the corresponding form operation in the correspondence.

13. The mobile terminal apparatus for form operation according to claim 12, wherein the criterion for the complexity of the customized hand gesture includes whether a number of inflections of a hand-gesture trajectory is within a preset inflection threshold.

14. The mobile terminal apparatus for form operation according to claim 12, wherein the one or more processors are configured to execute the set of instructions to cause the mobile terminal apparatus to further perform:

querying whether to replace an input password by the stored customized hand gesture;

in response to receiving an input to replace the input password:
displaying a password-setting page, and
storing a set password in the correspondence,
wherein triggering a corresponding form operation includes:
retrieving the stored password from the correspondence, and triggering a password verification operation.

15. The mobile terminal apparatus for form operation according to claim 12, wherein the one or more processors are configured to execute the set of instructions to cause the mobile terminal apparatus to further perform:
prompting the user to input one or more other customized hand gestures;
detecting whether the input customized hand gesture corresponds with at least some of the one or more other input customized hand gestures; and
in response to one or more correspondences, storing the input customized hand gesture and the corresponding input customized hand gestures into the correspondence.

16. The mobile terminal apparatus for form operation according to claim 11, wherein the one or more processors are configured to execute the set of instructions to cause the mobile terminal apparatus to further perform:
extracting a feature value of the input hand gesture, and comparing the feature value with a feature value of a first hand-gesture comparison rule in the correspondence; and
calculating a number of inflections of the input hand gesture, and comparing the calculated number of inflections with an inflection threshold of the first hand-gesture comparison rule in the correspondence.

17. The mobile terminal apparatus for form operation according to claim 11, wherein the correspondence includes at least one set of a hand gesture, a hand-gesture comparison rule, and a corresponding form operation, each set constituting a hand-gesture trigger template.

18. A mobile terminal apparatus for submitting a form, the mobile terminal apparatus comprising:
a memory storing a set of instructions; and
one or more processors configured to execute the set of instructions to cause the mobile terminal apparatus to perform:
adding a preset hand gesture to a correspondence by detecting an input customized hand gesture on a screen and storing the detected customized hand gesture in the correspondence;
detecting an input hand gesture on a screen, and acquiring a trajectory of the input hand gesture;
determining, in accordance with hand-gesture comparison rules, whether the acquired trajectory of the input hand gesture matches a preset hand gesture of a hand-gesture trigger template included in the correspondence and having a higher priority in accordance with priorities of hand-gesture trigger templates, wherein the priorities of hand-gesture trigger templates are sorted in accordance with historically cumulative operational numbers of hand gestures in the templates;
in response to a match, submitting the form,
wherein detecting the input customized hand gesture on the screen further includes:
determining whether complexity of the detected customized hand gesture meets a criterion: and
in response to the complexity of the detected customized hand gesture not meeting the criterion, detecting another input customized hand gesture.

19. The mobile terminal apparatus for submitting the form according to claim 18, wherein adding the preset hand gesture to the correspondence is further performed by:
prompting whether to add the preset hand gesture;
in response to an indication that the preset hand gesture is to be added,
displaying a hand-gesture setting page;
detecting the input customized hand gesture on the screen; and
storing the detected customized hand gesture to be the preset hand gesture.

20. The mobile terminal apparatus for submitting the form according to claim 19, wherein the one or more processors are configured to execute the set of instructions to cause the mobile terminal apparatus to further perform:
querying whether to replace an input password by the stored customized hand gesture;
in response to the query to replace an input password, displaying a password-setting page, and storing a set password, and
wherein submitting the form includes: retrieving the stored password, and triggering a password verification operation.

21. A non-transitory computer readable medium that stores a set of instructions that is executable by at least one processor of an apparatus to cause the apparatus to perform a method for form operation on a mobile terminal, the method comprising:
adding a hand gesture to a correspondence by detecting an input customized hand gesture on a screen and storing the detected customized hand gesture in the correspondence;
detecting an input hand gesture on a screen, and acquiring a trajectory of the input hand gesture;
matching, in accordance with hand-gesture comparison rules, the acquired trajectory of the input hand gesture with one or more hand gestures of a hand-gesture trigger template included in the correspondence and having a higher priority in accordance with priorities of hand-gesture trigger templates, wherein the priorities of hand-gesture trigger templates are sorted in accordance with historically cumulative operational numbers of hand gestures in the templates;
triggering a corresponding form operation in response to a match,
wherein detecting the input customized hand gesture on the screen further includes:
determining whether complexity of the detected customized hand gesture meets a criterion; and
in response to the complexity of the detected customized hand gesture not meeting the criterion, detecting another input customized hand gesture.

22. The non-transitory computer-readable medium of claim 21, wherein adding the hand gesture to the correspondence is further performed by:
prompting whether to add the hand gesture to the correspondence;
in response to receiving the input to add the hand gesture:
displaying a hand-gesture setting page,
detecting the input customized hand gesture on the screen, and
setting a corresponding hand-gesture comparison rule and a corresponding form operation; and
storing the detected customized hand gesture, the corresponding hand-gesture comparison rule, and the corresponding form operation in the correspondence.

23. The non-transitory computer-readable medium of claim 22, wherein after storing the detected customized hand gesture, the corresponding hand-gesture comparison rule, and the corresponding form operation in the correspondence, the method further comprises:

querying whether to replace an input password by the stored customized hand gesture; and in response to the query:

displaying a password-setting page, and storing a set password in the correspondence, wherein triggering the corresponding form operation if the matching is successful includes retrieving the stored password from the correspondence, and triggering a password verification operation.

24. A non-transitory computer readable medium that stores a set of instructions that is executable by at least one processor of an apparatus to cause the apparatus to perform a method for form operation on a mobile terminal, the method comprising:

adding a preset hand gesture to a correspondence by detecting an input customized hand gesture on a screen and storing the detected customized hand gesture in the correspondence:

detecting an input hand gesture on a screen, and acquiring a trajectory of the input hand gesture;

determining, in accordance with hand-gesture comparison rules, whether the acquired trajectory of the input hand gesture matches a preset hand gesture of a hand-gesture trigger template included in the correspondence and having a higher priority in accordance with priorities of hand-gesture trigger templates, wherein the priorities of hand-gesture trigger templates are sorted in accordance with historically cumulative operational numbers of hand gestures in the templates;

in response to a match, submitting the form, wherein detecting the input customized hand gesture on the screen further includes:

determining whether complexity of the detected customized hand gesture meets a criterion; and in response to the complexity of the detected customized hand gesture not meeting the criterion, detecting another input customized hand gesture.

* * * * *